July 28, 1931.     O. F. ROHWEDDER     1,816,399

SLICED BREAD PACKAGE

Filed Nov. 14, 1928

*INVENTOR*

Patented July 28, 1931

1,816,399

UNITED STATES PATENT OFFICE

OTTO F. ROHWEDDER, OF DAVENPORT, IOWA, ASSIGNOR TO MAC-ROH SALES & MFG. COMPANY, OF DAVENPORT, IOWA, A CORPORATION OF DELAWARE

SLICED BREAD PACKAGE

Application filed November 14, 1928. Serial No. 319,235.

My improvement relates to means for retaining the slices of a sliced loaf of bread in the same relative position occupied by them before they were sliced.

The objects of my invention are to provide means which may be applied to a sliced loaf of bread immediately after slicing and before the loaf is wrapped, which will 1. Retain the slices in their original position during the wrapping process;
2. Prevent the slices from becoming displaced during handling of the wrapped loaf, and
3. Operate to hold the remaining slices in their original position after a part of the loaf has been removed.

I attain these objects by the means illustrated in the accompanying drawings, in which,—

Figure 1:
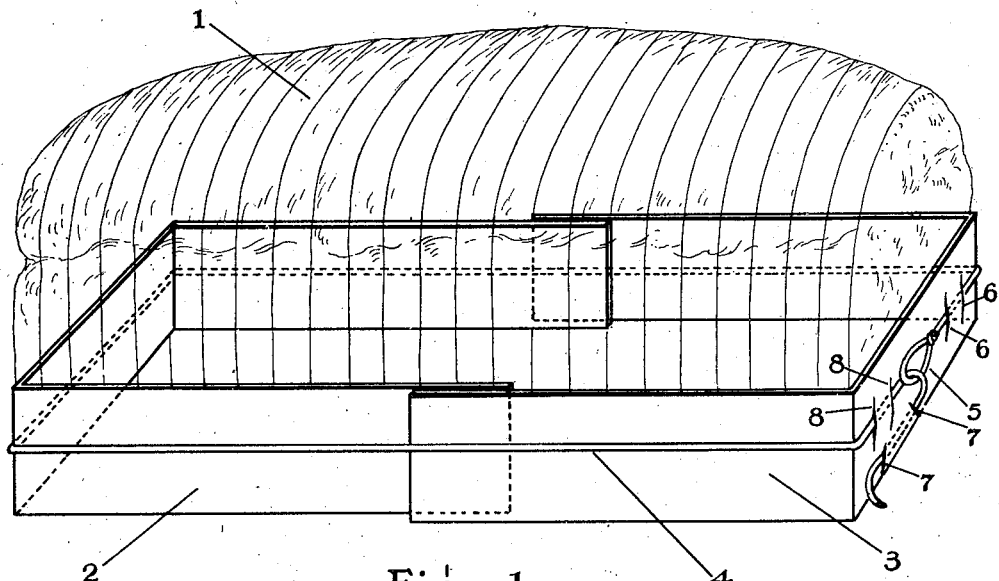
Figure 2:
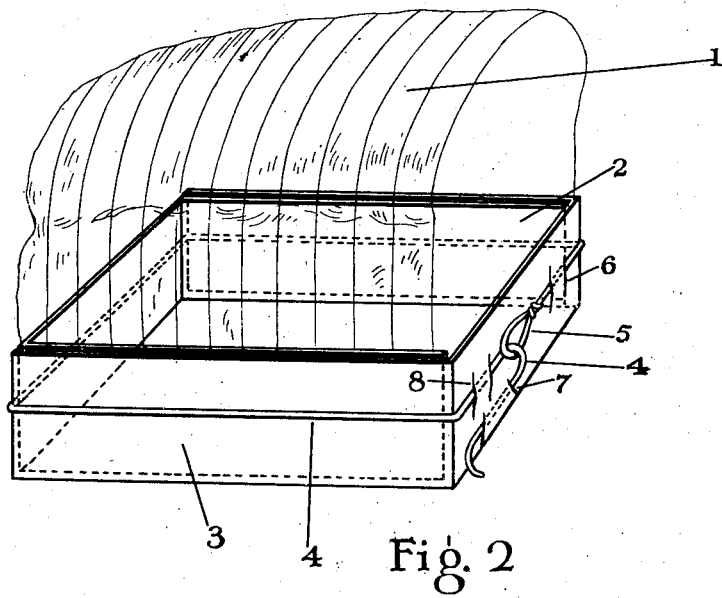

Figure 1 is a perspective view of my device showing a phantom loaf of sliced bread contained therein and Figure 2 is a view of my device showing one-half of a sliced loaf of bread retained therein.

My device comprises two flat strips, 2 and 3, of pasteboard or other suitable material bent to form a rectangle, with the ends of the strips overlapping, and of a size when extended, to embrace an entire loaf of sliced bread. A string, 4, is secured to the middle portion of one of the strips, 3, preferably by passing the ends of it through pairs of slits, 6 and 8, cut in the pasteboard strip. The ends of the string form a slip-knot, 5. Slits, 7, are cut in the lower edge of the strip, 3, and as the string is tightened around the bread by drawing up the slip-knot, the free end of the string may be passed through the slit, 7, which will act as a detent to hold the string and secure the retaining strips in their tightened or adjusted position upon the bread.

When a part of the bread has been removed, the string, 4, can be further tightened in the slip-knot, drawing the strips, 2 and 3, toward each other so as to keep them in close contact with the remaining portion of the bread, and if desired, the ends of the strips can be torn off so as to shorten the rectangle sufficiently to embrace a small number of slices.

While I have shown slits in the strip, 3, as a means for retaining the string, I do not confine myself to that method of fastening the string, but any suitable means may be used or the string may simply be tightened sufficiently to secure it in place without any special retaining means.

In the operation of my device, a loaf of bread is sliced by one of the slicing machines now coming into use. The strips, 2 and 3, are then applied to it with the ends slightly overlapping, the string is tightened up through the slip-knot until the strips, 2 and 3, embrace the loaf of bread tightly. The free end of the string is then secured in the slits, 7, or any other desired manner, and the loaf of bread may then be wrapped by the wrapping machine. While I prefer to apply my retaining means to the bread before the usual waxed paper wrapper is applied thereto, it is obvious that it may be applied outside of the wrapper.

When applied to the loaf of bread, my retainer will secure the slices in their original positions as against the ordinary shocks of handling which occur in loading or unloading bread from bread wagons and otherwise, thus tending to prevent the drying-out of the bread which naturally accompanies displacement of the slices.

After the wrapper has been removed from the bread in the home and a part of the loaf withdrawn, my retainer may be tightened up so as to secure the remainder of the loaf in its original position and prevent drying-out between meals.

While in the drawings I have shown my retainer extending upwardly a little more than one-third of the height of the loaf, it is obvious that the width of the strips, 2 and 3, may be varied to a large extent without departing from the spirit of my invention and the wider the strips are made, the more they will protect the bread against drying-out and against displacement. For practical purposes, strips from one-third to one-half the height of the loaf will be ample.

I claim:

1. A bread loaf package comprising, in combination, a baked loaf of bread cut into a multiplicity of slices, a retainer member for holding the sliced loaf substantially in its pre-sliced form, said container member consisting of a pair of substantially U-shaped members surrounding the ends and sides of the loaf and having their adjacent ends in overlapping relationship intermediate the ends of the loaf, adjustable means extending around said U-shaped members for regulating the pressure of said members against the ends of the contained sliced loaf to prevent drying out of the slices thereof, and an air and moisture-proof wrapper encasing said sliced loaf and retainer member.

2. A bread loaf package comprising, in combination, a baked loaf of bread cut into a multiplicity of slices, a retainer member for holding the sliced loaf substantially in its pre-sliced form, said member consisting of a pair of substantially U-shaped strips embracing the ends and sides of the sliced loaf and having their adjacent ends in overlapping relationship intermediate the ends of the loaf, a cord member extending around said U-shaped strips for holding the said strips firmly against the ends of the contained sliced loaf to prevent drying out of the slices thereof, said cord being adjustably arranged to hold the U-shaped strips firmly against the remaining slices after a number of slices have been removed.

In testimony whereof he affixes his signature.

OTTO F. ROHWEDDER.